United States Patent
Kim

(10) Patent No.: US 7,555,080 B2
(45) Date of Patent: Jun. 30, 2009

(54) DIGITAL BROADCASTING RECEIVING SYSTEM AND EQUALIZING METHOD THEREOF

(75) Inventor: Woo Chan Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 532 days.

(21) Appl. No.: 11/004,530

(22) Filed: Dec. 3, 2004

(65) Prior Publication Data

US 2005/0123077 A1    Jun. 9, 2005

(30) Foreign Application Priority Data

Dec. 4, 2003    (KR)    .................. 10-2003-0087663

(51) Int. Cl.
*H04B 1/10*    (2006.01)

(52) U.S. Cl. .................. 375/350; 375/147; 375/340; 375/341; 375/346; 375/262

(58) Field of Classification Search .................. 375/147, 375/340–341, 346, 350, 262
See application file for complete search history.

(56) References Cited

U.S. PATENT DOCUMENTS

| | | | | |
|---|---|---|---|---|
| 5,031,193 A * | 7/1991 | Atkinson et al. | ............ | 375/231 |
| 5,081,651 A * | 1/1992 | Kubo | ............ | 375/341 |
| 5,263,052 A * | 11/1993 | Borth et al. | ............ | 375/262 |
| 5,276,707 A * | 1/1994 | Baum | ............ | 375/233 |
| 5,448,590 A * | 9/1995 | Kostic | ............ | 375/232 |
| 5,537,443 A * | 7/1996 | Yoshino et al. | ............ | 375/340 |
| 6,246,732 B1 * | 6/2001 | Kobayashi et al. | ............ | 375/346 |
| 6,980,602 B1 * | 12/2005 | Kleinerman et al. | ............ | 375/262 |

FOREIGN PATENT DOCUMENTS

| | | |
|---|---|---|
| JP | 2000-068906 | 3/2000 |
| KR | 1997-0071724 | 11/1997 |

* cited by examiner

*Primary Examiner*—Shuwang Liu
*Assistant Examiner*—Kabir A Timory
(74) *Attorney, Agent, or Firm*—Lee, Hong, Degerman, Kang & Waimey

(57) ABSTRACT

A digital broadcasting receiving system and an equalizing method thereof are provided. The digital broadcasting receiving system includes: a demodulator for receiving and demodulating a RF (Radio Frequency) signal into a digital base band signal through A/D (Analog-to-Digital) conversion and carrier/timing restoration; an equalizer for compensating for a channel distortion included in the digital base band signal, through a coefficient updating depending on a feedback error value; a MLSE unit for estimating a transmission signal by using a MLSE (Maximum Likelihood Sequence Estimation) way using a correlation of past symbols for an output of the equalizer, and outputting an estimated MLSE decision signal; and an error generating unit for generating an error value from a difference between an equalized signal of the equalizer and the estimated MLSE decision signal of the MLSE unit, to feedback the error value to the equalizer.

21 Claims, 6 Drawing Sheets

DIGITAL BROADCASTING RECEIVING SYSTEM AND EQUALIZING METHOD THEREOF

This application claims the benefit of the Korean Application No. 10-2003-0087663 filed on Dec. 4, 2003, which is hereby incorporated by reference.

BACKGROUND OF THE INVENTION

1. Field of the Invention

The present invention relates to a digital broadcasting receiving system, and more particularly, to a method in which Maximum Likelihood Sequence Estimation (MLSE) is used for the equalization and the noise elimination of a digital broadcasting.

2. Discussion of the Related Art

In case where a signal is transmitted using sky wave or wire in most of digital transmission systems currently used, a transmission system using Pulse Amplitude Modulation (PAM) or Quadrature Amplitude Modulation (QAM) and an ATSC 8VSB transmission system proposed as American digital TV transmission way, signals reflected from various reflectors are combined and received. Since such reflected components cause the distortion of an original signal, the original signal cannot be obtained only with the received signal. An equalizer is used to compensate for the components (ghost or fading signal) causing the distortion of the transmission signal between a transmitting stage and a receiving stage as described above. The equalizer functions to eliminate the components causing the distortion of the original signal.

The equalizer uses a way in which an error is obtained from a difference between an output value of the equalizer and a decision value decided from the output value of the equalizer to update an equalization coefficient.

FIG. 1 is a block diagram illustrating a construction of a digital broadcasting receiving system using the equalizer.

A demodulator 101 performs Analogue-to-Digital (A/D) conversion and carrier restoration/timing restoration for a Radio Frequency (RF) signal received through an antenna, to convert the RF signal into a digital base band signal and output the converted signal to the equalizer 102.

The equalizer 102 updates a coefficient of a filter of the equalizer depending on an error value fed-back in an error generating unit 103 to compensate for a channel distortion included in the digital base band signal. That is, the equalizer 102 compensates for a variety of fading generated during the time when a signal travels from a transmitter to a receiver. An output of the equalizer 102 is inputted to a channel decoder (not shown) and at the same time, inputted to a slicer 104.

The slicer (or decision unit) 104 uses an 8-level slicer, for example.

That is, the slicer 104 receives the equalized signal and compares an equalized signal level with eight predetermined reference signal levels, to output the closest reference signal level to the equalized signal level, to an error generating unit 103 as a decision value.

The error generating unit 103 obtains a difference between an output signal of the equalizer 102 and a decision signal of the slicer 104, to use the obtained difference as an error. The error is fed-back to the equalizer 102. The equalizer 102 updates a coefficient of the equalizing filter by using the fed-back error.

At this time, there is a high possibility that the received signal traveling through a heavily distorted channel has a different decision value from a transmitted original signal. In this case, there is a drawback in that in the equalizer using the slicer of FIG. 1, an initial convergent speed is slow, and a tracing performance is degraded.

SUMMARY OF THE INVENTION

Accordingly, the present invention is directed to a digital broadcasting receiving system and an equalizing method thereof that substantially obviate one or more problems due to limitations and disadvantages of the related art.

An object of the present invention is to provide an equalizing method of a digital broadcasting receiving system in which a Maximum Likelihood Sequence Estimation (MLSE) decision signal is calculated from an equalized signal to generate an error, and a coefficient updating of an equalizing filter is performed.

Another object of the present invention is to provide an equalizing method of a digital broadcasting receiving system in which a Maximum Likelihood Sequence Estimation (MLSE) decision signal is calculated from an equalized signal to generate a reference noise signal, and a coefficient updating of a noise elimination filter is performed.

Another object of the present invention is to provide a digital broadcasting receiving system in which a Maximum Likelihood Sequence Estimation (MLSE) decision signal is used to perform equalization and noise elimination.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a digital broadcasting receiving system including: a demodulator for receiving and demodulating a RF (Radio Frequency) signal into a digital base band signal through A/D (Analog-to-Digital) conversion and carrier/timing restoration; an equalizer for compensating for a channel distortion included in the digital base band signal, through a coefficient updating depending on a fed-back error value; a MLSE unit for estimating a transmission signal by using a MLSE (Maximum Likelihood Sequence Estimation) way using a correlation of past symbols for an output of the equalizer, and outputting an estimated MLSE decision signal; and an error generating unit for generating an error value from a difference between an equalized signal of the equalizer and the estimated MLSE decision signal of the MLSE unit, to feedback the error value to the equalizer.

Preferably, the system further includes a noise eliminator disposed at an output terminal of the equalizer, for eliminating a noise amplified in an equalization process of the equalizer, wherein the MLSE unit estimates the transmission signal from an output of the noise eliminator to output the estimated MLSE decision signal to an error generating unit.

Preferably, in case where the transmission signal is convolution-encoded and transmitted at a transmitting side, the MLSE unit performs a viterbi decoding for the equalized signal to estimate the transmission signal.

Preferably, in case where the transmission signal is trellis-encoded and transmitted at the transmitting side, the MLSE unit performs a trellis decoding for the equalized signal to estimate the transmission signal.

Preferably, the error generating unit includes: a first error calculator for obtaining the difference between the equalized signal and the MLSE decision signal fed-back, to generate a first error signal; a second error calculator for comparing whether or not the equalized signal is more than zero and obtaining a difference between a first constant selected depending on the compared result and the equalized signal, to generate a second error signal; a third error calculator for outputting the first error signal as a third error signal if the first and second error signals have the same signs as each other, and outputting zero as the third error signal if the first and second error signals have different signs from each other; a fourth error calculator for squaring the equalized signal and multiplying the equalized signal by a difference between a squared value and a second constant, to generate a fourth error signal; and a final error calculator for combining the first to fourth error signals to generate a final error signal.

Preferably, the final error calculator includes: an absolute value arithmetic unit for obtaining an absolute value of the first error signal; a first selecting unit for selecting and outputting one of the second and fourth error signals; a first multiplier for multiplying an output of the first selecting unit by a third constant; a second multiplier for multiplying an output of the absolute value arithmetic unit and an output of the first multiplier; and a second selecting unit for selecting and feeding-back one of an output of the second multiplier and the first and third error signals, to the equalizer.

In another aspect of the present invention, there is provided a digital broadcasting receiving system including: a demodulator for receiving and demodulating a RF (Radio Frequency) signal into a digital base band signal through A/D (Analog-to-Digital) conversion and carrier/timing restoration; an equalizer for compensating for a channel distortion included in the digital base band signal, through a coefficient updating depending on a fed-back error value; a MLSE unit for estimating a transmission signal by using a MLSE (Maximum Likelihood Sequence Estimation) way using a correlation of past symbols for an output of the equalizer, and outputting an estimated MLSE decision signal; a slicer for comparing an output signal level of the equalizer with predetermined reference signal levels to output the closest reference signal level to the output signal level as a decision signal; and an error generating unit for selecting one of the MLSE decision signal of the MLSE unit and the decision signal of the slicer, and generating an error value from a difference between the selected signal and an equalized signal of the equalizer to feedback the generated error value to the equalizer.

Preferably, the system further includes a noise eliminator disposed at an output terminal of the equalizer, for eliminating a noise amplified in an equalization process of the equalizer, wherein the MLSE unit and the slicer unit estimate the transmission signal from an output of the noise eliminator to output the estimated decision signal to the error generating unit and the noise eliminator.

Preferably, the noise eliminator includes: a first reference noise generating unit for calculating a difference between the equalized signal of the equalizer and the decision signal of the slicer to generate a first reference noise signal; a noise error generating unit for subtracting an estimated noise signal from the first reference noise signal to generate a noise error signal; a first tap coefficient updating unit for performing a coefficient updating of a first tap by using the first reference noise signal and the noise error signal; a plurality of second reference noise generating units for respectively delaying the equalized signal of the equalizer by predetermined symbols to subtract the MLSE decision signal fed-back in the MLSE unit from the equalized signal, thereby respectively generating a plurality of second reference noise signals; a plurality of second tap coefficient updating units for performing a coefficient updating of taps other than the first tap by using the plurality of second reference noise signals and the noise error signal; an adder for adding all outputs of the first tap coefficient updating unit and the plurality of second tap coefficient updating units to output an estimated noise signal; and an eliminator for subtracting the outputted estimated noise signal of the adder from the equalized signal of the equalizer to eliminate a noise amplified in the equalization process.

In a further another aspect of the present invention, there is provided a digital broadcasting receiving system including: a demodulator for receiving and demodulating a RF (Radio Frequency) signal into a digital base band signal through A/D (Analogue-to-Digital) conversion and carrier/timing restoration; an equalizer for generating an error signal from a decision value or a Maximum Likelihood Sequence Estimation (MLSE) signal fed-back, to perform a coefficient updating, thereby compensating for a channel distortion included in the digital base band signal; a noise eliminator for generating a reference noise signal from the decision value and the MLSE signal fed-back, to eliminate a noise amplified in an equalization process of the equalizer; a MLSE unit for estimating a transmission signal in a MLSE way using a correlation of past symbols for an output of the noise eliminator, and outputting the estimated MLSE decision signal to the equalizer and the noise eliminator; and a slicer for comparing an output signal level of the noise eliminator with predetermined reference signal levels to output the closest reference signal level to the output signal level, to the equalizer and the noise eliminator as a decision signal.

In a still another aspect of the present invention, there is provided an equalizing method of a digital broadcasting receiving system for compensating for a channel distortion included in a reception signal, which is converted into a digital base band signal through demodulation and outputted, the method including the steps of: (a) compensating for the channel distortion included in the digital base band signal through a coefficient updating depending on an error value fed-back; (b) estimating a transmission signal in a MLSE way using a correlation of past symbols for the equalized signal, and outputting an estimated MLSE decision signal; and (c) generating the error value from a difference between the MLSE decision signal and an equalized signal to feedback to the step (a).

In a further still another aspect of the present invention, there is provided an equalization method of a digital broadcasting receiving system for compensating for a channel distortion included in a reception signal, which is converted into a digital base band signal through demodulation and outputted, the method including the steps of: (a) generating an error signal from a level decision signal or a MLSE decision signal fed-back, to perform a coefficient updating, thereby compensating for the channel distortion included in the digital base band signal; (b) generating a reference noise signal from the level decision signal and the MLSE decision signal fed-back, to eliminate a noise amplified in an equalization process of the step (a); (c) estimating a transmission signal in a MLSE way using a correlation of past symbols for an equalized signal noise-eliminated in the step (b), and outputting an estimated MLSE decision signal for the steps (a) and (b); and (d) comparing an output signal level of the equalized signal noise-eliminated in the step (b) with predetermined reference signal levels, to output the closest reference signal level to the output signal level as a level decision signal for the steps (a) and (b).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention is characterized in that in case where a transmitting stage performs a convolutional encoding or a trellis encoding to provide a correlation between signals and a transmitting, a receiving stage uses a Maximum Likelihood Sequence Estimation (MLSE) to estimate a transmission signal, and then uses the estimated MLSE decision signal for equalization and noise elimination.

In other words, an estimated result of the transmission signal using a MLSE way has a greater reliability than an estimated decision value of a transmission signal using an 8-level decider. Accordingly, an equalizing device using a MLSE decision signal can improve an initial convergence speed and a trace performance in comparison to an equalizing device using the 8-level decider.

Further, if the MLSE decision signal is used even in a noise eliminating device, a noise can be effectively eliminated even in so much fading environment.

Figure 2:
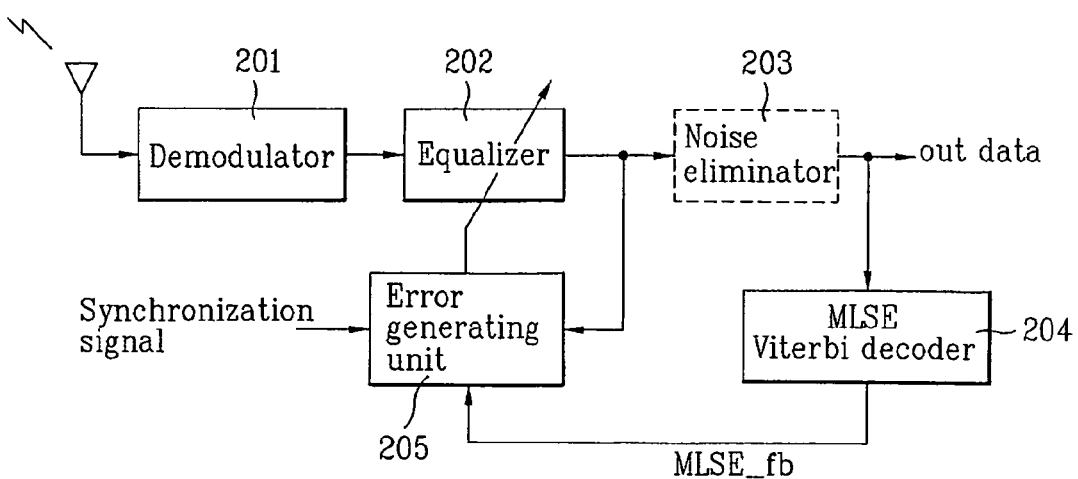
FIG. 2 is a block diagram illustrating a construction of an equalizing device of a digital broadcasting receiving system according to a first embodiment of the present invention.

FIG. 2 is a block diagram illustrating a construction of an equalizing device of a digital broadcasting receiving system according to a first embodiment of the present invention.

The equalizing device includes a demodulator 201, an equalizer 202, a MLSE unit 204, and an error generating unit 205.

The demodulator 201 performs a VSB demodulation for a RF signal received through an antenna, and converts the demodulated signal into a digital base band signal to output the converted signal to the equalizer 202.

The equalizer 202 compensates for a channel distortion included in a digital base band signal outputted from the demodulator 201 by a coefficient updating depending on an error value fed-back in the error generating unit 205.

The MLSE unit 204 uses the MLSE way for an output of the equalizer 202 to estimate the transmission signal, and feeds-back the estimated MLSE decision signal to the error generating unit 205.

The error generating unit 205 generates an error value from a difference between an output value of the equalizer 202 and an output value of the MLSE unit 204 to output the generated error value to the equalizer 202.

Here, the equalizer 202 can additionally include a noise eliminator 203 for eliminating a noise amplified through an equalization process, at its output terminal. If the noise eliminator 203 is additionally provided as shown using a dot line, the MLSE unit 204 applies the MLSE way to the signal outputted from the noise eliminator 203 to estimate the transmission signal. That is, the MLSE unit 204 estimates the transmission signal from the output of the equalizer 202 or the noise eliminator 203.

In the above constructed equalizing device, the demodulator 201 performs an Analog/Digital (A/D) conversion, a carrier restoration/timing restoration and the like for the RF signal received through the antenna to convert the RF signal into the digital base band signal and then, output the converted signal to the equalizer 202.

The equalizer 202 updates a coefficient of its filter depending on the error value fed-back in the error generating unit 205 to compensate for the channel distortion included in the digital base band signal. The output of the equalizer 202 is inputted to a channel decoder (not shown) and at the same time, inputted to the MLSE unit 204. If the noise eliminator 203 is used at an output terminal of the equalizer 202, the output of the noise eliminator 202 instead of the equalizer 202 is inputted to the MLSE unit 204.

That is, the MLSE unit 204 applies the MLSE way to the output of the equalizer 202 or the noise eliminator 203 to estimate the transmission signal.

In the present invention, the transmission signal estimated in the MLSE way is defined as "MLSE decision signal." The MLSE decision signal is fed-back to the error generating unit 205 to be used for error generation.

A currently estimated MLSE decision signal is obtained using a correlation of past symbols. The number of the past symbols according to the present invention can be arbitrarily determined. The more the symbols are used, the more a probability of the estimation of an exact signal is increased.

Additionally, the MLSE unit 204 can use various algorithms depending on a coding kind of a transmitted signal. For example, in case where the convolutional encoding is used at a transmitting side, the MLSE unit 204 uses a viterbi decoding algorithm to estimate the transmission signal. Further, in case where the trellis encoding is used at the transmitting side, the MLSE unit 204 uses a trellis decoding algorithm to estimate the transmission signal.

That is, the MLSE unit 204 applies the viterbi algorithm or the trellis decoding algorithm to decide and output an 8-level VSB signal.

The error generating unit 205 performs an arithmetic operation of a difference between the output signal of the equalizer 202 and the MLSE decision signal of the MLSE unit 204 to generate the error. This error value is fed-back to the equalizer 202 to update the coefficient of the filter installed in the equalizer 202. If so, the equalizer 202 updates the coefficient of the equalizing filter by using the fed-back error value.

Figure 3:
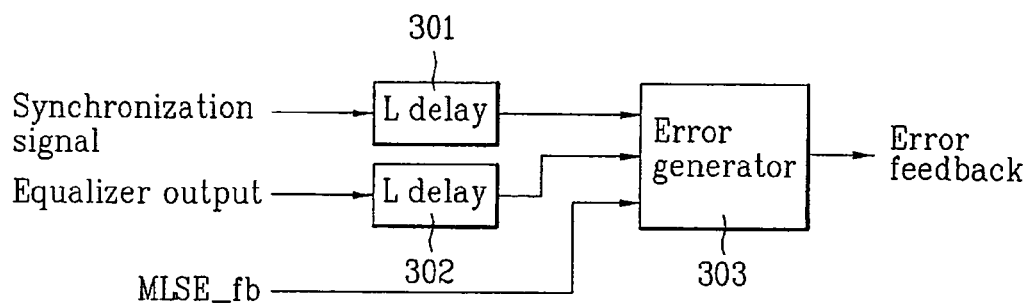
FIG. 3 is a block diagram illustrating an error generating unit considering a delay of a Maximum Likelihood Sequence Estimation (MLSE) unit of FIG. 2.

FIG. 3 illustrates a time delay relation of an equalizer output signal, a synchronization signal and a MLSE decision signal, which are inputted to the error generating unit 205. That is, since the MLSE way uses the past symbols prior to the current symbols for the MLSE estimation to decide a current MLSE decision signal, a time delay is generated as many as the number of the past symbols used.

Accordingly, the equalizer output signal and the synchronization signal are signals delayed as many as the number (L) of the past symbols used for the symbol estimation in the MLSE unit 204, to be synchronized with the MLSE decision signal so that the error is obtained in the error generating unit 205. That is, the first delay 301 delays the synchronization signal and the second delay 302 delays the output signal of the equalizer 202 or the noise eliminator 203, by "L" to output the delayed signal to the error generating unit 303. Here, the first and second delays 301 and 302 can be provided inside or outside the error generating unit 303. This is determined by a designer.

Figure 4A:
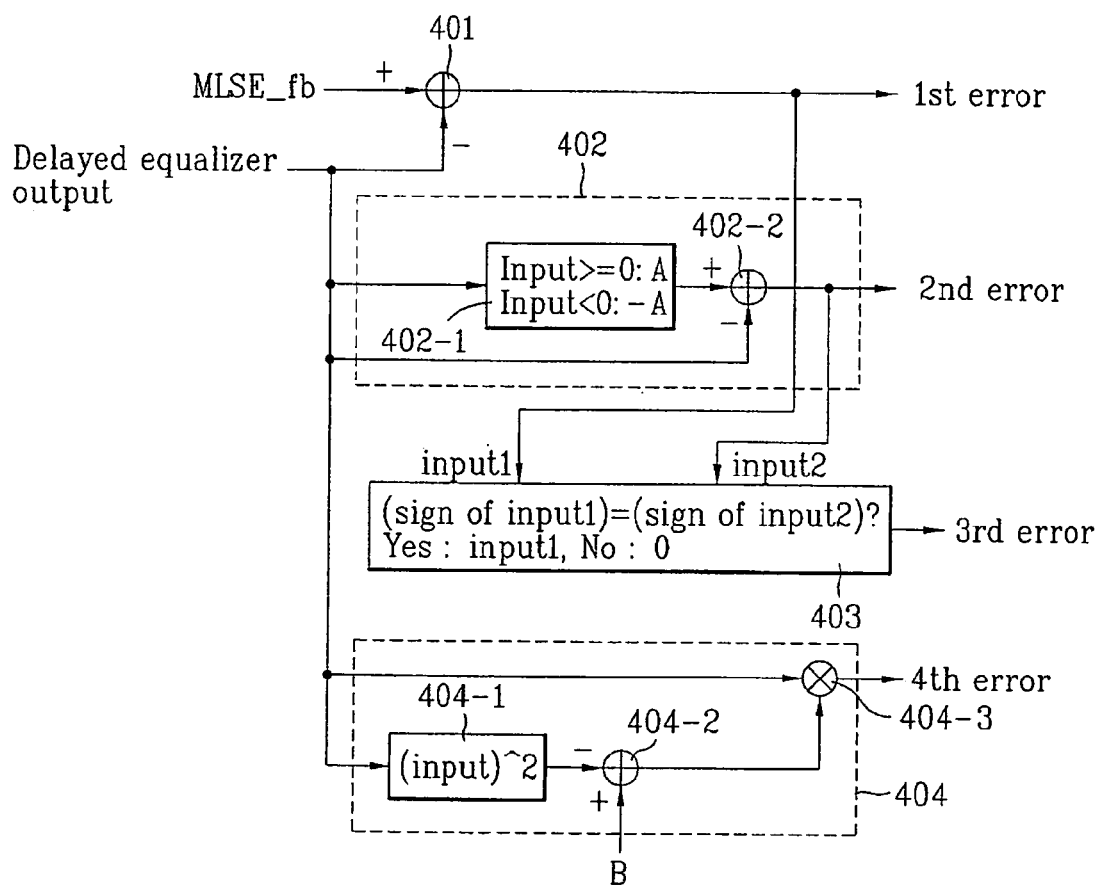
FIGS. 4A and 4B are detailed block diagrams illustrating an error generating unit of FIG. 2.
Figure 4B:
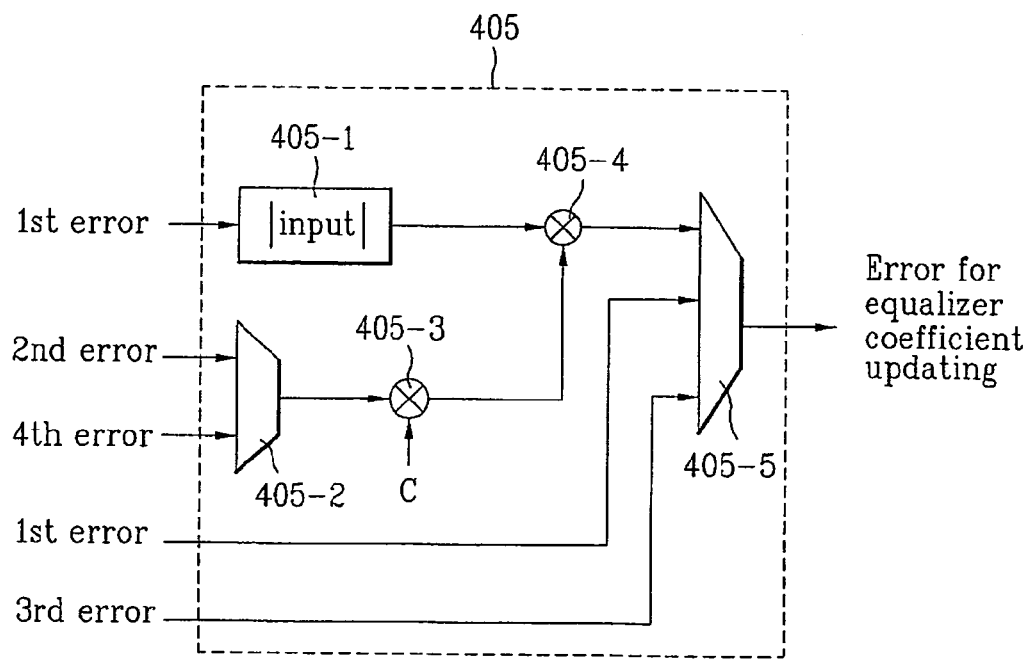

FIGS. 4A and 4B are detailed block diagrams illustrating the error generating unit 205 for generating the error value by using the MLSE decision signal outputted from the MLSE unit 204.

Referring to FIGS. 4A and 4B, the error generating unit 205 includes first to fourth error calculators 401 to 404 for generating first to fourth errors; and a final error calculator 405 for combining the calculated first to fourth error signals to generate a final error.

The first error calculator 401 generates the first error signal from the difference between the equalized signal (or the noise-eliminated signal) and the MLSE decision signal to output the generated signal to the final error calculator 405.

The second error calculator 402 compares whether or not the equalized signal (or the noise-eliminated signal) is more than zero. Depending on a comparison result, the second error calculator 402 generates the second error signal from the difference between a selected constant and the equalized signal to output the generated signal to the final error calculator 405.

The third error calculator 403 compares the output signals of the first and second error calculators 401 and 402 to generate the third error signal, and then outputs the generated third error signal to the final error calculator 405.

The fourth error calculator 404 squares the equalized signal (or the noise-eliminated signal) and multiplies the equalized signal (or the noise-eliminated signal) by a difference between the squared value and the constant to generate the fourth error signal, and then outputs the generated fourth error signal to the final error calculator 405.

The equalized signal (or the noise-eliminated signal) inputted to the error generating unit of FIGS. 4A and 4B is a signal delayed as many as "L" in the delay 302.

The signal equalized in the above constructed error generating unit of FIG. 4 means a signal outputted from the equalizer 202 and delayed in the delay 302. In case where the noise-eliminator 203 is additionally provided, the equalized signal means a signal outputted from the noise-eliminator 203 and delayed in the delay 302.

The first error calculator 401 obtains a difference between the MLSE decision signal and the equalized signal to output the obtained difference as a first error signal (1st error).

The second error calculator 402 includes a comparator 402-1 and a subtracter 402-2. If the equalized signal is more than or the same as zero, the comparator 402-1 outputs a constant (A) to the subtracter 402-2. IF being less, the comparator 402-1 outputs a constant (−A) to the subtracter 402-2. The subtracter 402-2 obtains a difference between the output value of the comparator 402-1 and the equalized signal to output the obtained difference value as a second error signal (2nd error).

The third error calculator 403 compares signs of the first error signal and the second error signal with each other, to output the first error signal as the third error signal if the first error signal and the second error signal have the same signs as each other, and select and output zero as the third error signal if the first error signal and the second error signal have different signs from each other.

The fourth error calculator 404 includes a squarer 404-1, a subtracter 404-2, and a multiplier 404-3. The squarer 404-1 squares the equalized signal to output the squared signal to the subtracter 404-2. The subtracter 404-2 obtains a difference between an output of the squarer 404-1 and a constant (B) to output the obtained difference to the multiplier 404-3, and the multiplier 404-3 multiplies the equalized signal by the output of the subtracter 404-2 to output the multiplies signal to the fourth error signal (4th error).

Here, the second to fourth error signals correspond to blind error signals.

Additionally, the second to fourth error signals have different trace performance, jitter or the like. For example, a trace performance of a channel fast changing is fast in a sequence of fourth error signal>third error signal>second error signal. On the contrary, a jitter is high in a sequence of fourth error signal>third error signal>second error signal. Accordingly, the error generating unit 205 can selectively use the trace performance and the jitter according to each feature of the error signals.

Additionally, the first to fourth error signals are outputted to the final error calculator 405.

The final error calculator 405 includes an absolute value arithmetic unit 405-1 for obtaining an absolute value of the first error signal; a first multiplexer 405-2 for selectively outputting one of the second and fourth error signals; a first multiplier 405-3 for multiplying an output of the first multiplexer 405-2 and a constant (C); a second multiplier 405-4 for multiplying an output of the absolute value arithmetic unit 405-1 and an output of the first multiplier 405-3; and a second multiplexer 405-5 for selecting one of an output of the second multiplier 405-4 and the first and third error signals to feedback the selected signal to the equalizer 202.

In other words, the absolute value arithmetic unit 405-1 obtains the absolute value of the first error signal to output the obtained absolute value to the second multiplier 405-4. Additionally, the first multiplexer 405-2 selects one of the second and fourth error signals to output the selected signal to the first multiplier 405-3, and the first multiplier 405-3 multiplies the constant (C) by the output of the first multiplexer 405-2 to output the multiplied result to the second multiplier 405-4. The second multiplier 405-4 multiplies an output of the absolute value arithmetic unit 405-1 and an output of the first multiplier 405-3 to output the multiplied result to the second multiplexer 405-5. The second multiplexer 405-5 selects one of an output of the second multiplier 405-4 and the first and third error signals as the final error signal to feedback the selected signal to the equalizer 202.

At this time, several methods can be used to select one of three error signals as the final error signal in the second multiplexer 405-5. For example, in a heavy ghost environment, the output of the second multiplier 405-4 can be selected to calculate an error value. Since the method of selecting one of the plurality of error signals as the final error signal can be selected by the designer, it is not limited to the above example.

If the MLSE decision signal is used as the error for updating the coefficient of the equalizer, more reliable error information can be used to improve an initial convergence feature and a trace feature of the equalizer.

Meanwhile, in another embodiment, the slicer and the MLSE unit are all provided, and one of the decision signal of the slicer or the MLSE decision signal of the MLSE unit is selected and used for error calculation according to case. Further, in case where the noise eliminator is additionally provided to the output terminal of the equalizer, the decision signal of the slicer and the MLSE decision signal of the MLSE unit are inputted to the noise eliminator and used for the calculation of a reference noise.

Figure 5:
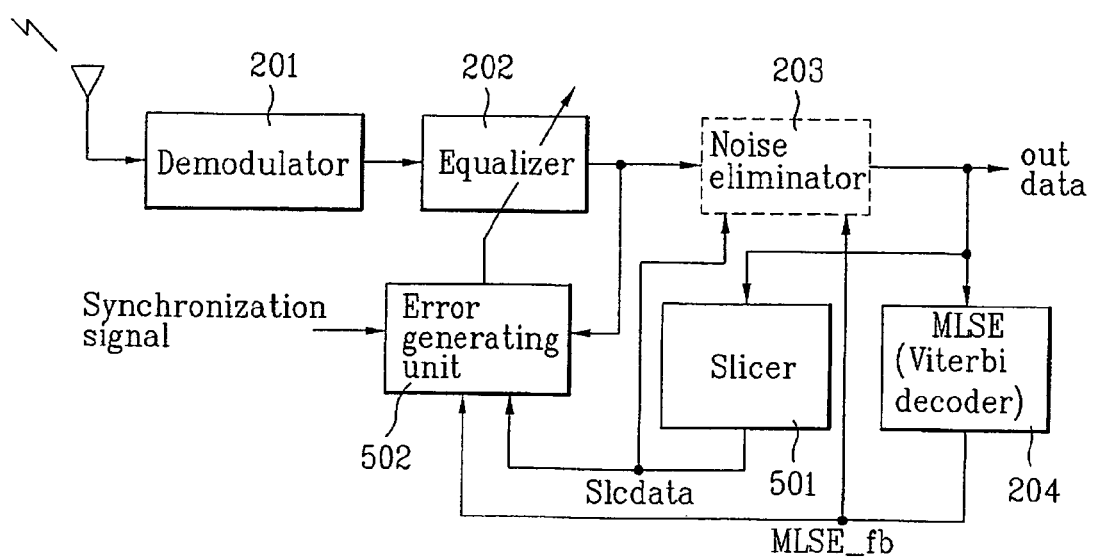
FIG. 5 is a block diagram illustrating a construction of an equalizing device of a digital broadcasting receiving system according to a second embodiment of the present invention.

FIG. 5 is a block diagram illustrating a construction of an equalizing device of the digital broadcasting receiving system according to a second embodiment of the present invention.

The equalizing device of FIG. 5 has the same construction as FIG. 2 excepting that a slicer 501 is added, and an error generating unit 502 selects a decision signal (Slcdata) decided at the slicer 501 or a MLSE decision signal (MLSE_fb) estimated in a MLSE unit 204 to generate the error.

Further, in case where a noise eliminator 203 is additionally provided, signals outputted from the slicer 501 and the MLSE unit 204 are used for noise estimation. That is, the decision signal (Slcdata) outputted from the slicer 501 is used for reference noise generation for updating a coefficient of a first tap of a noise filter installed in the noise eliminator 203. The MLSE decision signal (MLSE_fb) outputted from the MLSE unit 204 is used for the reference noise generation for updating coefficients of taps other than the first tap.

The same blocks of FIG. 5 use the same symbols as FIG. 2, and a detailed description thereof is omitted.

Figure 1:
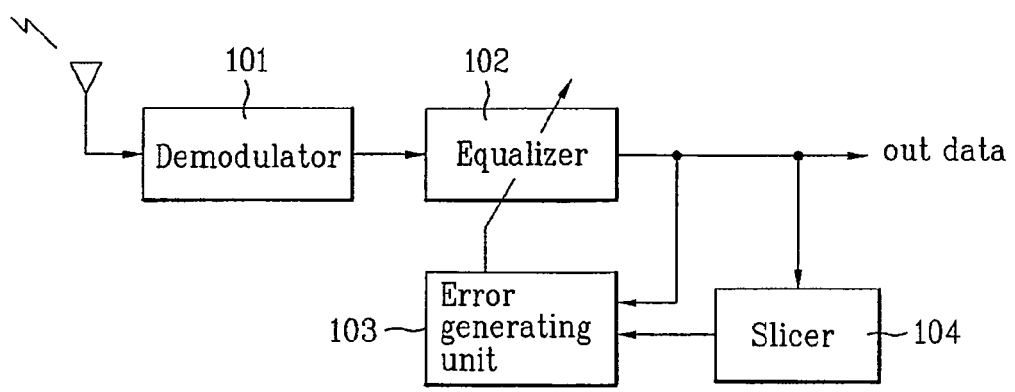
FIG. 1 is a block diagram illustrating a construction of a general equalizing device of a digital broadcasting receiving system.

Additionally, the slicer 501 can also have the same construction as the slicer of FIG. 1, and otherwise, can use another technology known in the art. For example, if the slicer 501 receives the equalized signal of the equalizer 202 or the noise eliminator 203, the slicer 501 compares the equalized signal level with eight predetermined reference signal levels to decide the closest reference signal level to the equalized signal level as a decision value, thereby outputting the decided signal level to the error generating unit 502 and the noise eliminator 203.

The MLSE unit 204 estimates the transmission signal from the equalized signal, which is outputted from the equalizer 202 or the noise eliminator 203, and outputs the estimated MLSE decision signal to the error generating unit 502 and the noise eliminator 203. At this time, the currently estimated signal is obtained by using the correlation of the past symbols. Further the number of the past symbols used can be arbitrarily determined. The more the symbols are used, the more a probability of the estimation of an exact signal is increased.

The error generating unit 502 selects one of the decision signal of the slicer 501 or the MLSE decision signal of the MLSE unit 204, and obtains the difference between the selected signal and the equalized signal to generate the error signal. The generated error signal is fed-back to the equalizer 202. If so, the equalizer 202 updates the coefficient of the equalizing filter by using the fed-back error signal to compensate for the channel distortion included in the received signal.

Figure 6:
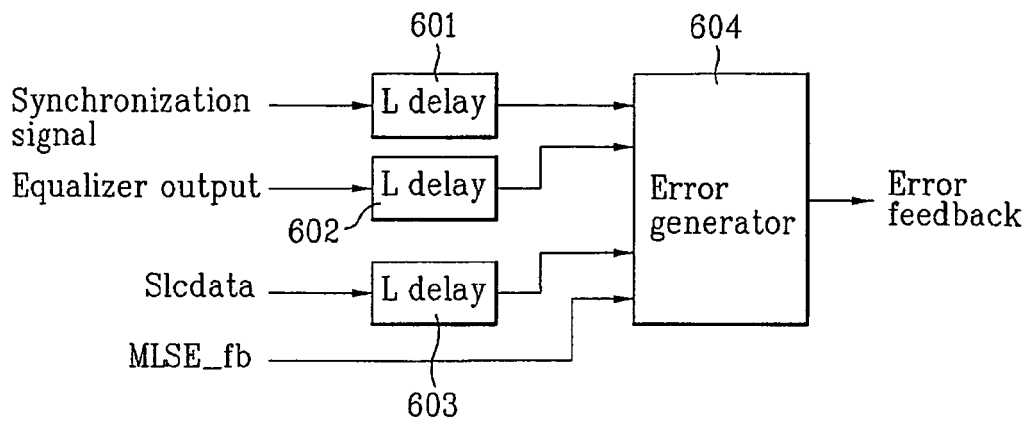
FIG. 6 is a block diagram illustrating a construction of an error generating unit considering a delay of a MLSE unit of FIG. 5.

FIG. 6 illustrates a time delay relation of an equalizer output signal, a synchronization signal, the decision signal and the MLSE decision signal, which are used as the input of the error generating unit 502. In other words, since the MLSE unit 204 decides a current MLSE decision signal by using the past symbols prior to the current symbol, the time delay is generated as many as the number of the past symbols used.

Accordingly, the equalizer output signal, the decision signal and the synchronization signal are signals delayed as many as the number (L) of the past symbols used in the MLSE unit 204, to be synchronized with the MLSE decision signal so that the error is obtained in the error generating unit 502.

That is, the first delay 601 delays the synchronization signal, the second delay 602 delays the equalized signal, and the third delay 603 delays the decision signal, by "L" to output the delayed signal to the error generating unit 604. Here, the first and third delays 601 and 603 can be provided inside or outside the error generating unit 604. This is determined by a designer.

Figure 7A:
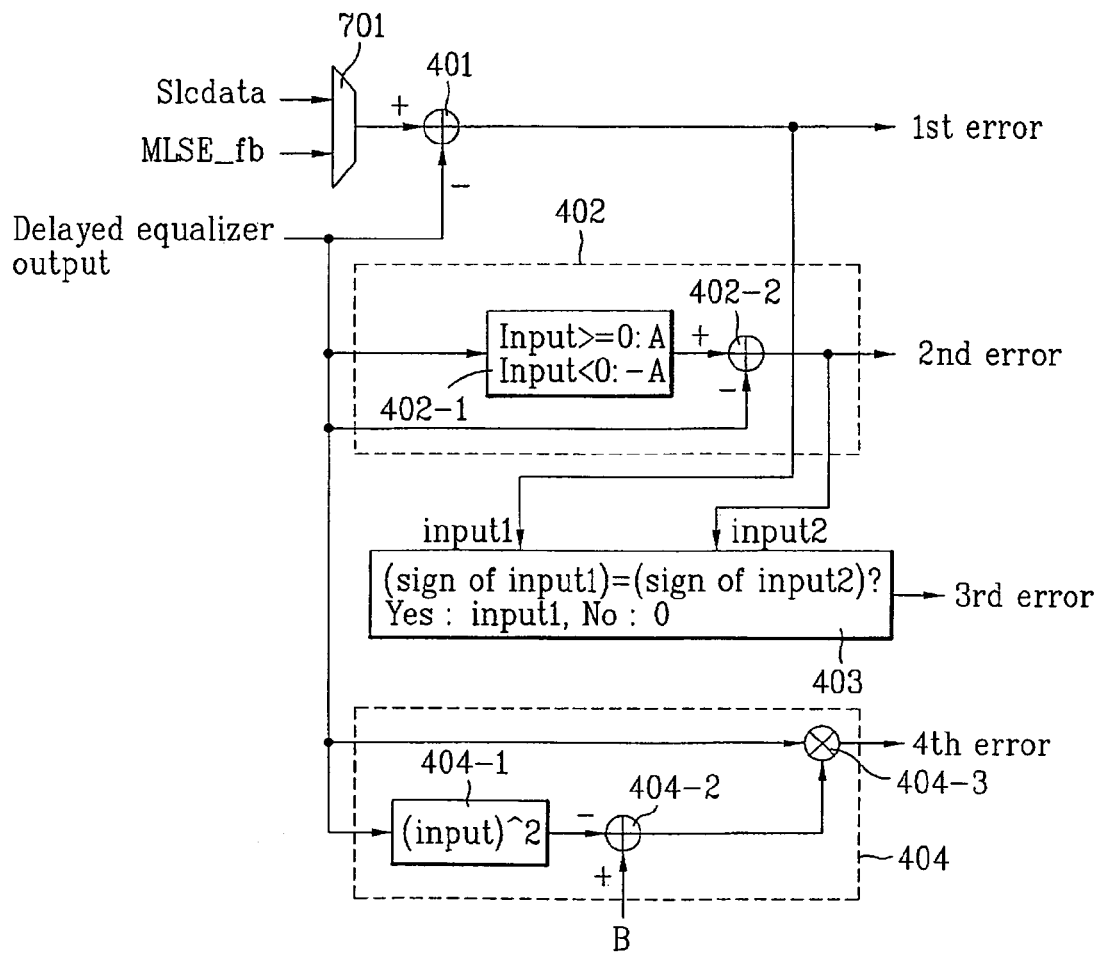
FIGS. 7A and 7B are detailed block diagrams illustrating an error generating unit of FIG. 5.
Figure 7B:
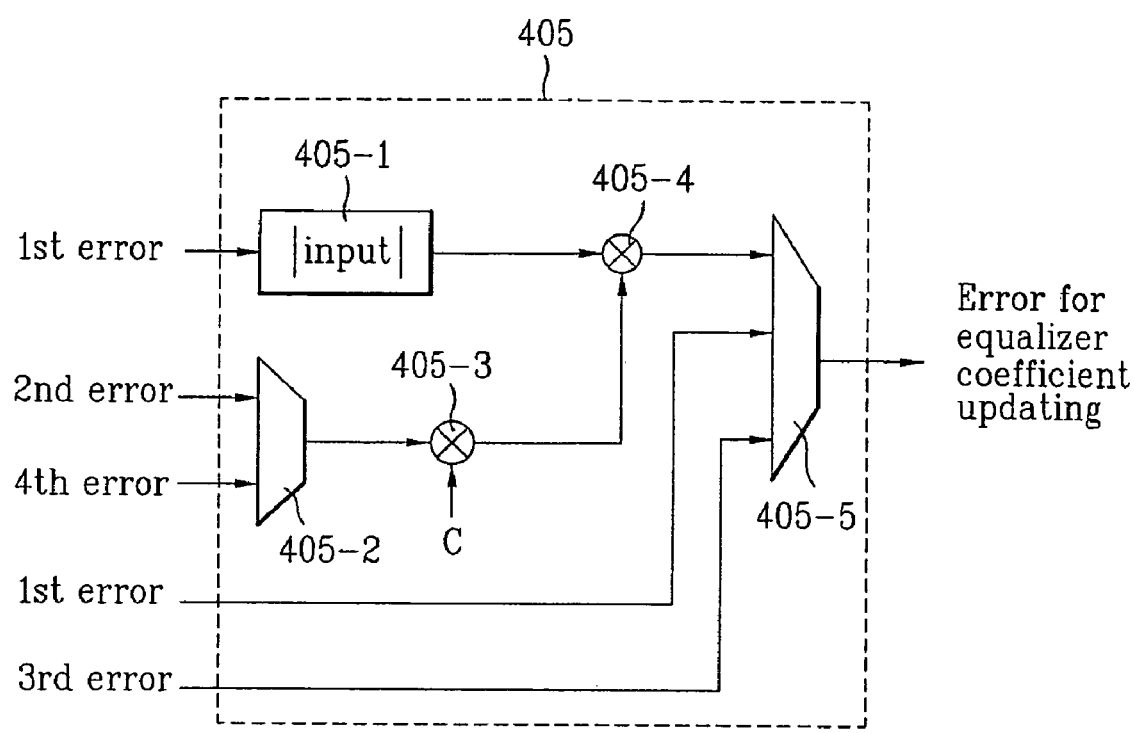

FIGS. 7A and 7B illustrate a detailed block diagram of the error generating unit 502 for generating the error value by using the decision signal (Slcdata) outputted from the slicer 501 or the MLSE decision signal (MLSE_fb) outputted from the MLSE unit 204.

The error generating unit 502 of FIGS. 7A and 7B has the same construction and operation as that of FIG. 4, excepting for a selecting unit 701 for selecting one of the decision signal of the slicer 501 and the MLSE decision signal of the MLSE unit 204 to output the selected signal to a first error calculator 401. Accordingly, the same blocks use the same symbols as those of FIG. 4, and a detailed description thereof is omitted.

That is, the selecting unit 701 selects one of the decision signal decided in the slicer 501 and the MLSE decision signal estimated in the MLSE unit 204, to output the selected signal to the first error calculator 401.

The first error calculator 401 obtains a difference between the signal outputted through the selecting unit 701 and the equalized signal to generate a first error signal.

A subsequent process is the same as that of the FIG. 4, and a detailed description thereof is omitted.

Figure 8:
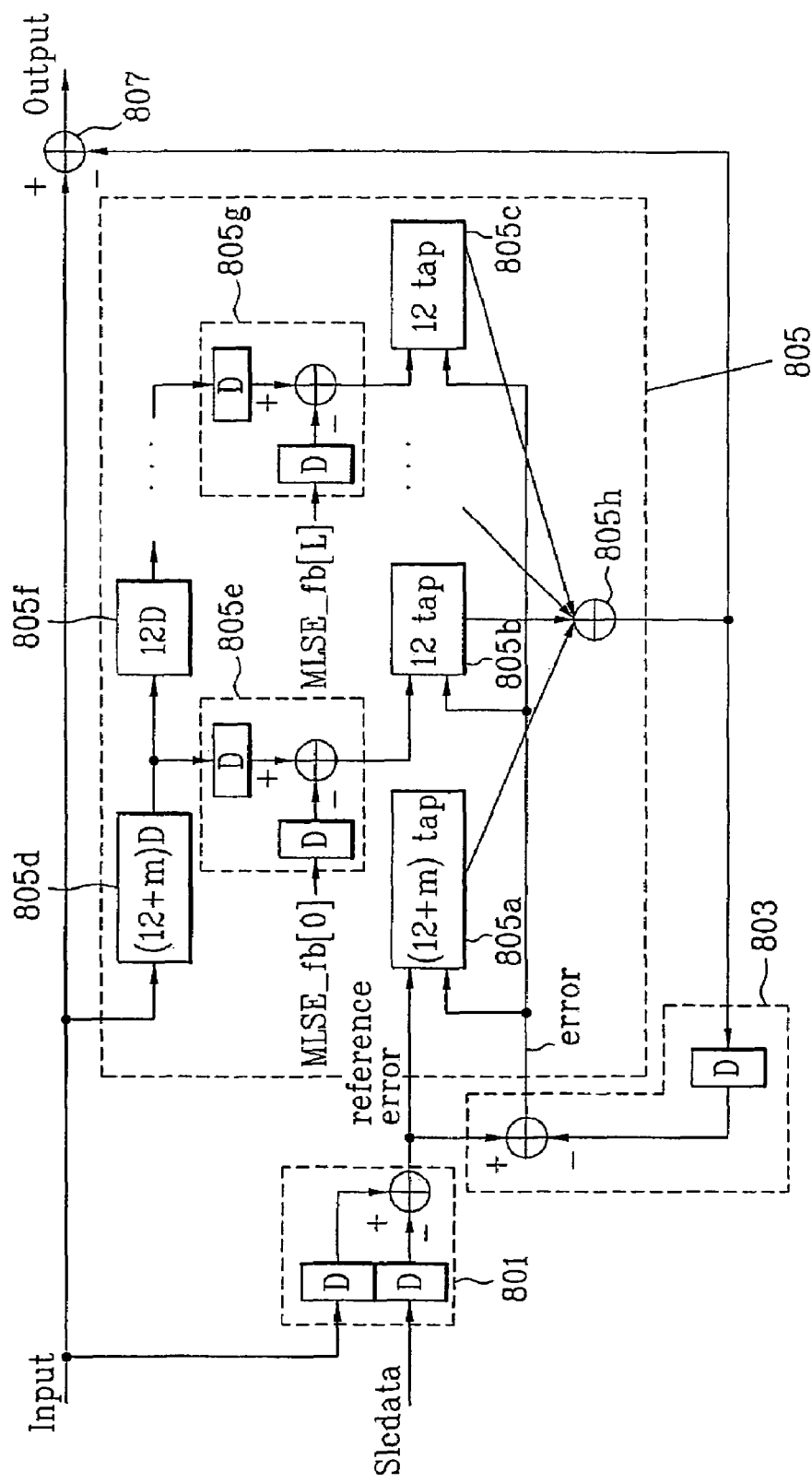
FIG. 8 is a block diagram illustrating a noise eliminating device of a digital broadcasting system according to a preferred embodiment of the present invention.

FIG. 8 is a detailed block diagram illustrating the noise eliminator 203. The noise eliminator 203 includes a first reference noise generating unit 801, a noise error generating unit 803, an n tap noise filter 805, and an eliminator 807.

That is, the signal equalized in the equalizer 202 is a signal including a noise amplified in the equalization process, and is inputted to the first reference noise generating unit 801, a first delay 805d of the n tap noise filter 805, and the eliminator 807.

The first reference noise generating unit 801 obtains a difference between the equalized signal of the equalizer 202 and the decision signal (Slcdata) of the slicer 501, to generate a first reference noise signal. The first reference noise generating unit 801 includes a delay for delaying the equalized signal, a delay for delaying the decision signal (Slcdata), and a subtracter for perform an arithmetic operation of a difference between two delays.

The first reference noise signal is outputted to the noise error generating unit 803 and a first tap coefficient updating unit 805a having a (12+m) tap length of the n tap noise filter 805. Here, "m" denotes a time taken to obtain the MLSE decision signal from the output of the noise eliminator 203.

The noise error generating unit 803 obtains a difference between the first reference noise signal and a noise signal estimated in the n tap noise filter 805, to generate the noise error signal. The noise error signal is commonly outputted to all of tap coefficient updating units 805a, 805b and 805c of the n tap filter 805. The noise error generating unit 803 includes a delay for delaying the estimated noise signal outputted from the n tap noise filter 805, and a subtracter for performing an arithmetic operation of a difference value between the first reference noise signal and the delayed estimated noise signal.

The tap coefficient updating units 805b and 805c other than the first tap coefficient updating unit 805a have a 12 tap length, and receive the reference noise signal and the noise error signal obtained from the MLSE decision signal (MLSE_fb) to perform the coefficient updating. That is, the first tap coefficient updating unit 805a receives the reference noise signal and the noise error signal obtained from the decision signal (Slcdata) of the slicer 501 to perform the coefficient updating.

Here, since the past symbols are used in the MLSE way, thereby causing the time delay in a process of obtaining the MLSE decision signal, the MLSE decision signal is not applied to the first tap. Accordingly, a current output signal decided through the slicer 501 is used for the first tap.

The n tap noise filter 805 uses a Least Mean Square (LMS) coefficient updating way of a tapped delay-line type.

In other words, the n tap noise filter 805 includes a plurality of delays 805d, 805f, . . . for sequentially delaying the equalized signal; a plurality of reference noise generating units 805e, . . . , 805g connected to the output terminals of the delays 805d, 805f, . . . to generate a corresponding reference noise signal from the delayed signal and the MLSE decision signal; and a plurality of tap coefficient updating units 805a, 805b, . . . 805c connected to the output terminals of the reference noise generating units 801, 805e, . . . , 805g to perform the coefficient updating by using the corresponding reference noise signal and the noise error signal; and an adder 805h for adding outputs of the coefficient updating units 805a, 805b, . . . 805c to output the estimated noise signal. The estimated noise signal of the adder 805h is inputted to the eliminator 807 and the noise error generating unit 803.

The coefficient updating way of the tap coefficient updating units 805a, 805b, . . . , 805c is expressed as in the following Equation 1:

$$c(k, n+1) = c(k,n) + u*e(n)*x(k,n) \quad [\text{Equation 1}]$$

where, n: integer from 0 to n k: $k_{th}$ tap coefficient e(n): noise error value outputted from the noise error generating unit 803, and x(k,n): reference noise value of n time and $k_{th}$ tap At this time, the signal equalized in the equalizer 202 is delayed as much as (12+m) symbol time in the (12+m)D delay 805d, and then is outputted to the reference noise generating unit 805e. "(12+m)D" denotes an initial input signal delay, and "m" denotes a time taken to obtain the MLSE decision signal from the output of the noise eliminator 203.

Additionally, a MLSE decision signal (MLSE_fb[0]) inputted from the reference noise generating unit 805e is estimated and obtained at a decoding depth of 1.

In other words, the reference noise generating unit 805e performs an arithmetic operation of a difference between the equalized signal delayed and outputted from the (12+m)D delay 805d and the MLSE decision signal (MLSE_fb[0]) to generate a second-tap reference noise signal. The second-tap reference noise signal is inputted to the second tap coefficient updating unit 805b having the 12 tap length. The tap coefficient updating unit 805b performs the coefficient updating by applying the inputted second reference noise signal and noise error signal to Equation 1, and outputs the updated result to the adder 805h. The reference noise generating unit 805e includes a delay for one-symbol delaying the signal delayed in the delay 805d; a delay for one-symbol delaying the MLSE decision signal (MLSE_fb[0]) fed-back in the MLSE unit 204; and a subtracter for performing an arithmetic operation of a difference between two delays.

Further, the signal delayed for a (12+m)-symbol time in the delay 805d is again delayed for a 12-symbol time in a 12D delay 805f to be outputted to the reference noise generating unit disposed at just next stage.

Additionally, the MLSE decision signal (MLSE_fb[L]) inputted to the last reference noise generating unit 805g of the noise filter 805 is estimated and obtained at a decoding depth of (L+1).

In other words, the reference noise generating unit 805g performs an arithmetic operation of a difference between the equalized signal delayed and outputted from the last delay and the MLSE decision signal (MLSE_fb[L]) to generate the reference noise signal of the last tap. The reference noise signal is inputted to the last tap coefficient updating unit 805c having the 12 tap length. The coefficient updating unit 805c applies the inputted reference noise signal and noise error signal to Equation 1 to perform the coefficient updating, and outputs the updated result to the adder 805h.

For one example, in an 8T-VSB system, the time delay between states is performed for the 12-symbol time. This is because a 12-symbol interleaving is performed while the trellis encoding is performed. Accordingly, if the decoding depth, that is, the number of the states traced back is increased by 1 to estimate the transmission signal, the symbols are estimated for a 12*depth time-delayed signal. Therefore, the MLSE decision signal (MLSE_fb[L]) is an estimation value obtained by tracing back the state of L+1.

In other words, the MLSE unit 204 employs a viterbi decoding algorithm or a trellis decoding algorithm every decoding depth to estimate a 8-level VSB signal and output the estimated signal to a corresponding reference noise generating unit. At this time, as the decoding depth is increased, the MLSE estimation is improved in reliability.

The above process is repeatedly performed as many as the number of LMS filter tap coefficient updating units. As the number of the filter tap is increased, the noise elimination performance is increased.

The noise predicted at a 12-tap interval through the tap coefficient updating units 805a, . . . , 805c is combined through the adder 805h and becomes the estimated noise.

The estimated noise is outputted to the eliminator 807 and the noise error generating unit 803. The eliminator 807 eliminates the noise amplified in the equalization process, by subtracting the estimated noise from the equalized signal of the equalizer 202.

The present invention can also use other types of filter, which can perform a noise prediction, instead of the LMS filter.

As such, the noise elimination using the feedback of the MLSE decision signal with a high reliability provides an improved performance in comparison to the noise elimination using only the decision value of the slicer.

Table 1 represents an improvement result of a performance of the noise eliminator using the MLSE output according to the present invention.

TABLE 1

|  | Noise eliminator using only decision value of slicer | Noise eliminator using MLSE according to the present invention |
|---|---|---|
| Reception possible range | 3 µs | 5 µs |

The result of Table 1 represents a reception possible range measured for 0 dB, single ghost in a VSB digital broadcasting receiving system. In the noise eliminator using only the decision value, a maximal delay time of the ghost is 3 µs. In the inventive noise eliminator using the decision value and the MLSE decision signal, the maximal delay time is 5 µs. Accordingly, the inventive noise eliminator shows the improved performance.

As described above, the present invention employs the MLSE way to estimate the transmission signal, and then uses the estimated MLSE decision signal for the equalization and the noise elimination. Accordingly, the present invention is effective in case where the transmitting stage performs the encoding such as the convolutional encoding or the trellis encoding for the correlation between the signals, and then performs the transmission.

The effects of the digital broadcasting receiving system and the equalizing method thereof according to the present invention are described as in the following.

First, the MLSE way is employed to estimate the transmission signal from the equalized signal, and the estimated MLSE decision signal and the equalized signal are used to generate the equalizer coefficient updating error so that the reliability of the decision signal is increased to improve the initial convergent speed and the trace performance of the equalizer.

Second, the initial convergent speed and the trace performance are improved in a very large fading environment in comparison to the equalizer using the conventional slicer.

Third, the MLSE signal is used to generate an exact reference noise signal, thereby improving the noise elimination performance of even the signal passing through the channel with very much fading.

Fourth, the equalizing device and the noise eliminator having the improved performance are used in the digital broadcasting receiving system to improve the performance of the entire digital broadcasting receiving system.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A digital broadcasting receiving system comprising:
   a demodulator for receiving and demodulating a RF (Radio Frequency) television signal into a digital television (DTV) base band signal through A/D (Analog-to-Digital) conversion and carrier and timing restoration;
   an equalizer for compensating channel distortion included in the digital base band signal, through a coefficient updating depending on a fed-back error value;
   a MLSE unit for estimating a transmission signal by using a MLSE (Maximum Likelihood Sequence Estimation) method using a correlation of past symbols of an output of the equalizer, and outputting an estimated MLSE decision signal; and
   an error generating unit for generating an error value from a difference between an equalized signal of the equalizer and the estimated MLSE decision signal of the MLSE unit, to feedback the error value to the equalizer, wherein the error generating unit comprises:
   a first error calculator for obtaining the difference between the equalized signal and the MLSE decision signal fed-back, to generate a first error signal;
   a second error calculator for comparing whether or not the equalized signal is more than zero and obtaining a difference between a first constant selected depending on a compared result and the equalized signal, to generate a second error signal;
   a third error calculator for outputting the first error signal as a third error signal if the first and second error signals have the same signs as each other, and outputting zero as the third error signal if the first and second error signals have different signs from each other;
   a fourth error calculator for squaring the equalized signal and multiplying the equalized signal by a difference between a squared value and a second constant, to generate a fourth error signal; and
   a final error calculator for combining the first to fourth error signals to generate a final error signal.

2. The system of claim 1, further comprising a noise eliminator disposed at an output terminal of the equalizer, for eliminating a noise amplified in an equalization process of the equalizer,
   wherein the MLSE unit estimates the transmission signal from an output of the noise eliminator to output the estimated MLSE decision signal to an error generating unit.

3. The system of claim 1, wherein in case where the transmission signal is convolution-encoded and transmitted at a transmitting side, the MLSE unit performs a viterbi decoding for the equalized signal to estimate the transmission signal.

4. The system of claim 1, wherein in case where the transmission signal is trellis-encoded and transmitted at the transmitting side, the MLSE unit performs a trellis decoding for the equalized signal to estimate the transmission signal.

5. The system of claim 1, wherein the equalized signal input to the error generating unit is a signal delayed as many as the number of past symbols used to estimate the transmission signal in the MLSE unit.

6. The system of claim 1, wherein the final error calculator comprises:
   an absolute value arithmetic unit for obtaining an absolute value of the first error signal;
   a first selecting unit for selecting and outputting one of the second and fourth error signals;
   a first multiplier for multiplying an output of the first selecting unit by a third constant;
   an second multiplier for multiplying an output of the absolute value arithmetic unit and an output of the first multiplier; and
   a second selecting unit for selecting and feeding-back one of an output of the second multiplier and the first and third error signals, to the equalizer.

7. A digital broadcasting receiving system comprising:
   a demodulator for receiving and demodulating a RF (Radio Frequency) television signal into a digital base band signal through A/D (Analog-to-Digital) conversion and carrier and timing restoration;
   an equalizer for compensating for a channel distortion included in the digital base band signal, through a coefficient updating depending on a fed-back error value;
   a MLSE unit for estimating a transmission signal by using a MLSE (Maximum Likelihood Sequence Estimation) way using a correlation of past symbols of an output of the equalizer, and outputting an estimated MLSE decision signal;
   a slicer for comparing an output signal level of the equalizer with predetermined reference signal levels to output the closest reference signal level to the output signal level as a decision signal; and
   an error generating unit for selecting one of the MLSE decision signal of the MLSE unit and the decision signal of the slicer, and generating an error value from a difference between the selected signal and an equalized signal of the equalizer to feedback the generated error value to the equalizer, wherein the error generating unit comprises:

a selecting unit for selecting and outputting one of the MLSE decision signal of the MLSE unit and the decision signal of the slicer;

a first error calculator for obtaining a difference between the selected signal of the selecting unit and the equalized signal, to generate a first error signal;

a second error calculator for comparing whether or not the equalized signal is more than zero and obtaining a difference between a first constant selected depending on a compared result and the equalized signal, to generate a second error signal;

a third error calculator for outputting the first error signal as a third error signal if the first and second error signals have the same signs as each other, and outputting zero as the third error signal if the first and second error signals have different signs from each other;

a fourth error calculator for squaring the equalized signal and multiplying the equalized signal by a difference between a squared value and a second constant to generate a fourth error signal; and a final error calculator for combining the first to fourth error signals to generate a final error signal.

8. The system of claim 7, wherein the final error calculator comprises:

an absolute value arithmetic unit for obtaining an absolute value of the first error signal;

a first selecting unit for selecting and outputting one of the second and fourth error signals;

a first multiplier for multiplying an output of the first selecting unit by a third constant;

an second multiplier for multiplying an output of the absolute value arithmetic unit and an output of the first multiplier; and a second selecting unit for selecting and feeding-back one of an output of the second multiplier and the first and third error signals, to the equalizer.

9. The system of claim 7, further comprising a noise eliminator disposed at an output terminal of the equalizer, for eliminating a noise amplified in an equalization process of the equalizer, wherein the MLSE unit and the slicer estimate the transmission signal from an output of the noise eliminator to output the estimated decision signal to the error generating unit and the noise eliminator.

10. The system of claim 9, wherein the noise eliminator comprises:

a first reference noise generating unit for calculating a difference between the equalized signal of the equalizer and the decision signal of the slicer to generate a first reference noise signal;

a noise error generating unit for subtracting an estimated noise signal from the first reference noise signal to generate a noise error signal;

a first tap coefficient updating unit for performing a coefficient updating of a first tap by using the first reference noise signal and the noise error signal;

a plurality of second reference noise generating units for respectively delaying the equalized signal of the equalizer by predetermined symbols to subtract the MLSE decision signal fed-back in the MLSE unit, thereby respectively generating a plurality of second reference noise signals;

a plurality of second tap coefficient updating units for performing a coefficient updating of taps other than the first tap by using the plurality of second reference noise signals and the noise error signal;

an adder for adding all outputs of the first tap coefficient updating unit and the plurality of second tap coefficient updating units to output an estimated noise signal; and an eliminator for subtracting the outputted estimated noise signal of the adder from the equalized signal of the equalizer to eliminate a noise amplified in the equalization process.

11. The system of claim 10, wherein the first tap coefficient updating unit and the plurality of second tap coefficient updating units perform the coefficient updating in a LMS (Least Mean Square) way.

12. The system of claim 10, wherein the MLSE unit generates a MLSE decision signal at each of decoding depths to output the generated MLSE decision signal to a corresponding second reference noise generating unit.

13. A digital broadcasting receiving system comprising:

a demodulator for receiving and demodulating a RF (Radio Frequency) television signal into a digital base band signal through A/D (Analogue-to-Digital) conversion and carrier and timing restoration;

an equalizer for updating a coefficient based on an error signal, thereby compensating for channel distortion included in the digital base band signal;

a noise eliminator for generating a reference noise signal from the decision value and the MLSE signal fed-back, to eliminate a noise amplified in an equalization process of the equalizer;

a MLSE unit for estimating a transmission signal in a MLSE way using a correlation of past symbols for an output of the noise eliminator, and outputting the estimated MLSE decision signal to the equalizer and the noise eliminator;

a slicer for comparing an output signal level of the noise eliminator with predetermined reference signal levels to output the closest reference signal level to the output signal level, to the equalizer and the noise eliminator as a decision signal; and an error generating unit for selecting one of the MLSE decision signal of the MLSE unit and the decision signal of the slicer, and generating the error signal from a difference between the selected signal and a signal equalized in the equalizer, wherein the error generating unit comprises:

a selecting unit for selecting and outputting one of the MLSE decision signal of the MLSE unit and the decision signal of the slicer;

a first error calculator for obtaining a difference between the signal selected in the selecting unit and the equalized signal, to generate a first error signal;

a second error calculator for comparing whether or not the equalized signal is more than zero and obtaining a difference between a first constant selected depending on a compared result and the equalized signal, to generate a second error signal;

a third error calculator for outputting the first error signal as a third error signal if the first and second error signals have the same signs as each other, and outputting zero as the third error signal if the first and second error signals have different signs from each other;

a fourth error calculator for squaring the equalized signal and multiplying the equalized signal by a difference between a squared value and a second constant to generate a fourth error signal; and a final error calculator for combining the first to fourth error signals to generate a final error signal.

14. The system of claim 13, wherein the noise eliminator comprises:
a first reference noise generating unit for calculating a difference between the equalized signal of the equalizer and the decision signal of the slicer to generate a first reference noise signal;
a noise error generating unit for subtracting an estimated noise signal from the first reference noise signal to generate a noise error signal;
a first tap coefficient updating unit for performing a coefficient updating of a first tap by using the first reference noise signal and the noise error signal;
a plurality of second reference noise generating units for respectively delaying the equalized signal of the equalizer by predetermined symbols to subtract the MLSE decision signal fed-back in the MLSE unit, thereby respectively generating a plurality of second reference noise signals;
a plurality of second tap coefficient updating units for performing a coefficient updating of taps other than the first tap by using the plurality of second reference noise signals and the noise error signal;
an adder for adding all outputs of the first tap coefficient updating unit and the plurality of second tap coefficient updating units to output an estimated noise signal; and
an eliminator for subtracting the outputted estimated noise signal of the adder from the equalized signal of the equalizer to eliminate a noise amplified in the equalization process.

15. The system of claim 14, wherein the MLSE unit generates the MLSE decision signal at each of decoding depths to output the generated MLSE decision signal to a corresponding second reference signal generating unit.

16. An equalizing method of a digital broadcasting receiving system for compensating for a channel distortion included in a digital television (DTV) signal, the DTV signal converted into a digital base band signal through demodulation and output, the method comprising:
compensating for the channel distortion included in the digital base band signal by updating a coefficient according to a fed-back error value;
estimating a transmission signal using a MLSE method using a correlation of past symbols for the equalized signal, and outputting an estimated MLSE decision signal; and
generating the error value from a difference between the MLSE decision signal and an equalized signal to generate a fed-back error value, wherein generating the error value comprises:
obtaining a difference between the MLSE decision signal and the equalized signal to generate a first error signal;
determining whether the equalized signal is greater than zero and obtaining a difference between a first constant and the equalized signal in order to generate a second error signal, the first constant selected according to the determination;
outputting the first error signal as a third error signal if the first and second error signals have the same signs, and outputting zero as the third error signal if the first and second error signals have different signs;
squaring the equalized signal and multiplying the equalized signal by a difference between a squared value and a second constant to generate a fourth error signal; and
combining the first to fourth error signals to generate a final error signal.

17. The method of claim 16, further comprising eliminating a noise amplified in an equalization process of the channel distortion compensation.

18. The method of claim 16, wherein estimating the transmission signal comprises the MLSE unit performing a viterbi decoding for the equalized signal to estimate the transmission signal if the transmission signal is convolution-encoded and transmitted at a transmitting side.

19. The method of claim 16, wherein estimating the transmission signal comprises the MLSE unit performing a trellis decoding for the equalized signal to estimate the transmission signal if the transmission signal is trellis-encoded and transmitted at the transmitting side.

20. An equalization method of a digital broadcasting receiving system for compensating for a channel distortion included in a digital television (DTV) signal, the DTV signal converted into a digital base band signal through demodulation and outputted, the method comprising:
generating an error signal by selecting one of a fed-back level decision signal and a fed-back MLSE decision signal in order to update a coefficient, thereby compensating for the channel distortion included in the digital base band signal, wherein one of the fed-back MLSE decision signal and the fed-back level decision level fed-back is selected, and an error signal is generated from a difference between the selected signal and the equalized signal;
generating a reference noise signal from the fed-back level decision signal and the fed-back MLSE decision signal in order to eliminate a noise amplified in an equalization process of the channel distortion compensation;
estimating a transmission signal in a MLSE method using a correlation of past symbols for the reference noise signal, and outputting an estimated MLSE decision signal for the channel distortion compensation; and
comparing an output signal level of the reference noise signal with predetermined reference signal levels in order to output the closest predetermined reference signal level to the output signal level as a level decision signal for the channel distortion compensation, wherein generating the error signal comprises:
selecting and outputting one of the MLSE decision signal and the level decision signal;
obtaining a difference between the selected and outputted signal and the equalized signal to generate a first error signal;
determining whether the equalized signal is greater than zero and obtaining a difference between a first constant and the equalized signal in order to generate a second error signal, the first constant selected according to the determination;
outputting the first error signal as a third error signal if the first and second error signals have the same signs, and outputting zero as the third error signal if the first and second error signals have different signs;
squaring the equalized signal and multiplying the equalized signal by a difference between the squared equalized signal value and a second constant to generate a fourth error signal; and combining the first through fourth error signals to generate a final error signal.

21. The method of claim 20, wherein generating the reference noise signal comprises:

calculating a difference between the equalized signal and the level decision signal in order to generate a first reference noise signal;

subtracting an estimated noise signal from the first reference noise signal in order to generate a noise error signal;

updating a coefficient of a first LMS (Least Mean Square) filter tap by using the first reference noise signal and the noise error signal;

delaying the equalized signal by predetermined symbols in order to subtract the MLSE decision signal, thereby generating a plurality of second reference noise signals;

updating a coefficient of LMS filter taps other than a first tap by using the plurality of second reference noise signals and the noise error signal;

adding all outputs of the updated first tap coefficient and the updated second tap coefficient in order to output an estimated noise signal; and subtracting the estimated noise signal from the equalized signal in order to eliminate the noise amplified in the equalization process.

* * * * *